(12) United States Patent
Golec

(10) Patent No.: US 11,661,144 B2
(45) Date of Patent: May 30, 2023

(54) CHAIN GUIDE FOR A REAR DERAILLEUR OF A BICYCLE

(71) Applicant: Marcin Golec, London (GB)

(72) Inventor: Marcin Golec, London (GB)

(*) Notice: Subject to any disclaimer, the term of this patent is extended or adjusted under 35 U.S.C. 154(b) by 151 days.

(21) Appl. No.: 17/334,747

(22) Filed: May 30, 2021

(65) Prior Publication Data

US 2021/0371048 A1 Dec. 2, 2021

(30) Foreign Application Priority Data

May 29, 2020 (EP) ..................................... 20177531

(51) Int. Cl.
*B62M 9/126* (2010.01)

(52) U.S. Cl.
CPC .................................. *B62M 9/126* (2013.01)

(58) Field of Classification Search
CPC ....................................................... B62M 9/126
USPC ........................................................... 474/80
See application file for complete search history.

(56) References Cited

U.S. PATENT DOCUMENTS

2007/0202977 A1* 8/2007 Watarai .................. B62M 9/126
474/82

FOREIGN PATENT DOCUMENTS

| CN | 108284914 A | * | 7/2018 | |
|----|-------------|---|--------|---|
| CN | 209776722 U | * | 12/2019 | |
| GB | 610582 A1 | * | 10/1948 | |
| WO | WO-2019197058 A1 | * | 10/2019 | ............ B62M 9/124 |

* cited by examiner

*Primary Examiner* — Gene O Crawford
*Assistant Examiner* — Emily R Kincaid
(74) *Attorney, Agent, or Firm* — Mark M. Friedman

(57) ABSTRACT

The present invention relates to a chain guide for a bicycle rear derailleur comprising a cage, a guide pulley rotatably mounted to the cage, a circular tension pulley rotatably mounted to the cage, and means for connecting the chain guide to a movable member of a rear derailleur so as to move the chain guide with respect to a bicycle cassette, wherein the guide pulley and the tension pulley are adapted to be engageable with a bicycle chain and wherein the tension pulley is rotatably mounted to the cage by mounting means and an interposed bearing, wherein the mounting means of the tension pulley are arranged so as to be spaced from the center of rotation of the tension pulley and wherein the mounting means are stationary in respect to the cage in the mounted state of the chain guide.

20 Claims, 17 Drawing Sheets

CHAIN GUIDE FOR A REAR DERAILLEUR OF A BICYCLE

The present invention relates to an improved chain guide for a rear derailleur of a bicycle, the change guide comprising: a cage, a circular guide pulley rotatably mounted on the cage, a circular tension pulley rotatably mounted to the cage, and means for connecting the chain guide to a movable member of a derailleur so as to move the chain guide with respect to the bicycle, wherein the guide pulley and the tension pulley are adapted to be engageable with a bicycle chain.

Such a chain guide, as it is disclosed in EP 1 764 297 B1 or EP 1 568 592 B1, for example, is one component of rear derailleurs of bicycles. The chain guide of EP 1 764 297 B1 or EP 1 568 592 B1 comprises a cage made of two lateral plates, namely an inner cage and an outer cage, which hold between them two spaced co-planar toothed pulleys, known respectively as the guide pulley (top as seen in the state mounted to the bicycle) and the tension pulley (bottom as seen in the state mounted to the bicycle). The guide pulley and the tension pulley guide the bicycle chain in an S-shaped pattern. As is well-known in the art, the cage can rotate on its plane and is spring-loaded to take up chain slack. The cage is positioned under the desired sprocket of a cogset (cassette), i.e. the set of multiple sprockets attached to the hub of the rear wheel of the bicycle, by an arm that can swing back and forth under the sprockets. Gear shifting is carried out by moving the arm, either by electric actuation (for instance by means of a suitable electromotor) or by manually actuating a rear shifter mounted on a handle bar of the bicycle. The rear shifter is operatively connected to the rear derailleur via a Bowden-type control cable, in a known manner, such that the chain guide transfers the chain from one sprocket to another one while pedaling.

Since the derailleur came into use in the prior art, the chain guides for the same have been made very simple. The same is true for the pulleys of the chain guides. In fact, the prior art chain guide pulleys, which are plastic or aluminum gears usually having around 10-12T (10-12 teeth), are supported by central bearings which are fitted on central bolts which connect the two lateral plates of the cage to each other.

Typically, in the prior art as shown for instance in EP 1 568 592 B1, the bolts go through the center of the bearing and hold the pulleys in the cage and between the two lateral plates of the cage. Both pulleys are pivot-mounted in this way. This is even the case if a pulley is oversized to 18T (18 teeth), for example, to reduce friction and drag. The bearings are usually very small, namely so small that e.g. a 5 mm diameter bolt can pass through the inner diameter of the bearing. The latter dictates the outer diameter of the bearing as well, so that prior art bearings are very small, for example 6×17×6 mm (including inner and outer bearing rings called races as well as the rolling elements between them). Such small-sized bearings are not very durable, even if implemented by ball bearings. Further, dirt, mud and grass tend to be piled up between the pulleys and the lateral plates (e.g. in cyclocross races where excessive grass accumulation can lead to breakage of the entire cage or clog the cage so much that it prevents the rear derailleur from being able to shift between cogs reliably). Pulley structural arms are also a place of dirt, mud and grass collection significantly restricting the movement of the pulleys between the plates.

CN 209 776 722 U describes a chain guide with a cage rotatably holding a tension pulley, wherein the tension pulley is held on a bearing by mounting means. The mounting means and the tension pulley are rotatable together with the inner race of the bearing in respect to the cage.

U.S. Pat. No. 5,466,194 A describes a chain guide with a cage rotatably holding a tension pulley, wherein the tension pulley is rotatable about a central bolt passing through the plates of the cage.

The present invention is directed, at least in part, to improving or overcoming one or more drawbacks of the prior art system. In particular, there is a need to improve the durability of a chain guide for a bicycle, in particular a chain guide for a rear derailleur of a bicycle.

Within the object of improving durability of a chain guide for a bicycle, in particular a chain guide for a rear derailleur of a bicycle, the present invention also aims to improve the durability of the bearings of the chain guide.

A further object of the present invention is to avoid the accumulation of dirt in a chain guide (and in pulley structural arms) during the use of the bicycle, in particular if the use of the bicycle takes place off road.

Yet another object of the present invention is to simplify the construction of a chain guide for a bicycle, in particular a chain guide for a rear derailleur of a bicycle.

Yet an additional object of the present invention is to simplify the construction of a chain guide for a bicycle, in particular a chain guide for a rear derailleur of a bicycle, while increasing the durability thereof and/or minimizing the accumulation of dirt during the use of the bicycle.

The foregoing objects and further objects which are apparent hereinafter and/or inferred by the person skilled in the art based on the present description are achieved by a chain guide as defined in the appended claims.

According to one aspect, the present invention provides a chain guide for a rear derailleur of a bicycle having the features of claim 1. By such a chain guide, low friction and drag as well as high durability can be achieved.

Furthermore, according to the present invention, the tension pulley, which is a circular pulley, is rotatably mounted to the cage of the rear derailleur not by a central bolt, but by mounting means and an interposed bearing, wherein the mounting means are arranged so as to be spaced from the center of rotation of the tension pulley. Thus, according to the invention the mounting means are positioned along a circular mounting opening provided in the cage spaced away from the center of rotation of the tension pulley. Preferably the mounting means are spaced by at least 5 mm from center of rotation of the tension pulley, more preferably by at least 10 mm from center of rotation of the tension pulley and most preferably 20 mm from center of rotation of the tension pulley.

Preferably, the mounting means of the guide pulley, which is also a circular pulley, are devised in a similar manner.

The spacing from the center of rotation of the tension pulley (and possibly also of the guide pulley) allows use of an oversized bearing having a much larger diameter than usual chain guide bearings, which substantially increases durability.

Inasmuch as according to the invention the bearing is not supported on a central bolt but circumferentially by mounting means, a much larger radius can be achieved for the bearing. This additionally reduces the supporting forces to such an extent that it is no longer necessary to support the bearing/s from both sides between two lateral plates of a cage, as is the case in the prior art solutions (see for instance EP 1 568 592 B1) with two-plate-cages and intervening bolts. Instead, if a cage with two lateral plates (inner and outer cage) is used, the reduction of forces renders the construction and dimensioning of the cage less demanding.

At any rate, the benefits of the present invention are applicable to both single-plate and two-plate cages.

Moreover, due to the presence of the bearings which are circumferentially mounted by mounting means of the invention, it is possible to redesign the cage of the chain guide in a less closed manner without hidden regions or regions which cannot be readily accessed, reducing subsequently accumulations of dirt, providing good self-cleanability and offering an attractive appearance.

In preferred embodiments, the mounting means are comprised of a lockring which may be fixed to the cage of the chain guide by a circumferential thread or by one or more bolts positioned on the circumference of mounting means. Nevertheless, in terms of durability, robustness and simplicity, the solution of threaded lockring provides more advantages than fixing the mounting means to the cage of the chain guide with bolts.

Advantageously, the guide pulley may be rotatably mounted to the cage of the chain guide by mounting means and an interposed bearing arranged so as to leave a free space in the center of the guide pulley in its mounted state. The spacing of the mounting means from the center of rotation of the tension pulley or pulleys provides for a free opening which works against accumulation of dirt because rotating pulley structural arms have been eliminated, and the chain guide is easy to clean. In addition, the free opening, at least in the center of the tension pulley, provides for a totally new and impressive look of the derailleur.

Preferably, the tension pulley and the guide pulley are provided on the same plane and form thus a common plane in the mounted state thereof.

In preferred embodiments, the cage of the chain guide includes a circular mounting opening for the tension pulley and possibly also a circular mounting opening for the guide pulley. In the latter case, the two openings may be provided on the left and on the right, respectively, of the plane of the common pulleys (or, in other words, on opposite sides of the common plane of the pulleys). In the latter embodiment, the cage further includes a transition section which is partially S-shaped as seen from a distant point lying on the common plane of the pulleys. That is, while the guide pulley is held on its outer side (with respect to the bicycle), the tension pulley is held on its inner side, thus presenting its whole characteristic appearance to the observer.

In preferred embodiments, the bearing is a ball bearing consisting of a set of balls possibly held spaced by a circular cage, the balls rolling between races, which could be formed by an outer side of the circular mounting means and an inner side of the hollow pulley. Such a bearing may have, for example, an inside diameter of 52 mm, an outside diameter of 58 mm and a width of 4 mm. Although probably not necessary in view of small forces, of course roller bearings instead of ball bearings may be applicable as well as sliding bearings that are very well-known in the art of pulley construction. In fact, sliding bearings have been made by Shimano for very long time.

While the bearing balls, bearing races or rollers could be metallic (steel), as is most common, it may be preferable to make them from ceramics, in order to be dry-running, lubrication-free, corrosion-resistant and maintenance-free and to always present a good look. Alternatively, roll bearings having plastic rolls or ball bearings having plastic balls may be applicable.

As an alternative to the abovementioned bearings, a low friction and drag bearing may be implemented as a sliding bearing, for example as a sleeve bushing made from plastic, polymer, metal composite or ceramics. Such sliding bearings are particularly advantageous, as they are dry-running and lubrication-free, low-weight, corrosion-resistant and maintenance-free.

According to preferred aspects of the invention, the mounting means may include at least one lockring. When the mounting means consist of a single lockring, the lockring may be provided with a circumferential thread for threading engagement with the cage. Alternatively, the thread can be replaced by one or more one bolts passing through the lockring for threading engagement with the cage.

According to further aspects of the invention which are applicable to cages with two plates (inner and outer cage), the tension pulley may be rotatably held between the outer cage and the inner cage and the mounting means may be implemented as one or more locking bolts connecting the outer cage and the inner cage, such as to rotatably hold the tension pulley with the interposed bearing in the cage. The locking bolt or bolts may be replaced by at least one lockring which connects the outer cage and the inner cage, such as to rotatably hold the tension pulley with the interposed bearing in the cage. In the embodiments with one single lockring, the lockring may be provided with a circumferential thread for threading engagement with one of the outer and the inner cage. The circumferential thread can be replaced by one or more bolts extending circumferentially. In the embodiments with two lockrings each of the lockrings is provided with a respective circumferential thread for mutual threading engagement thereof, such that the inner and the outer cage are firmly held between the two lockrings.

The above and other features of the invention will become apparent from the following description of a preferred embodiment, given by way of non-limiting example with reference to the accompanying drawings, wherein.

Figure 1:
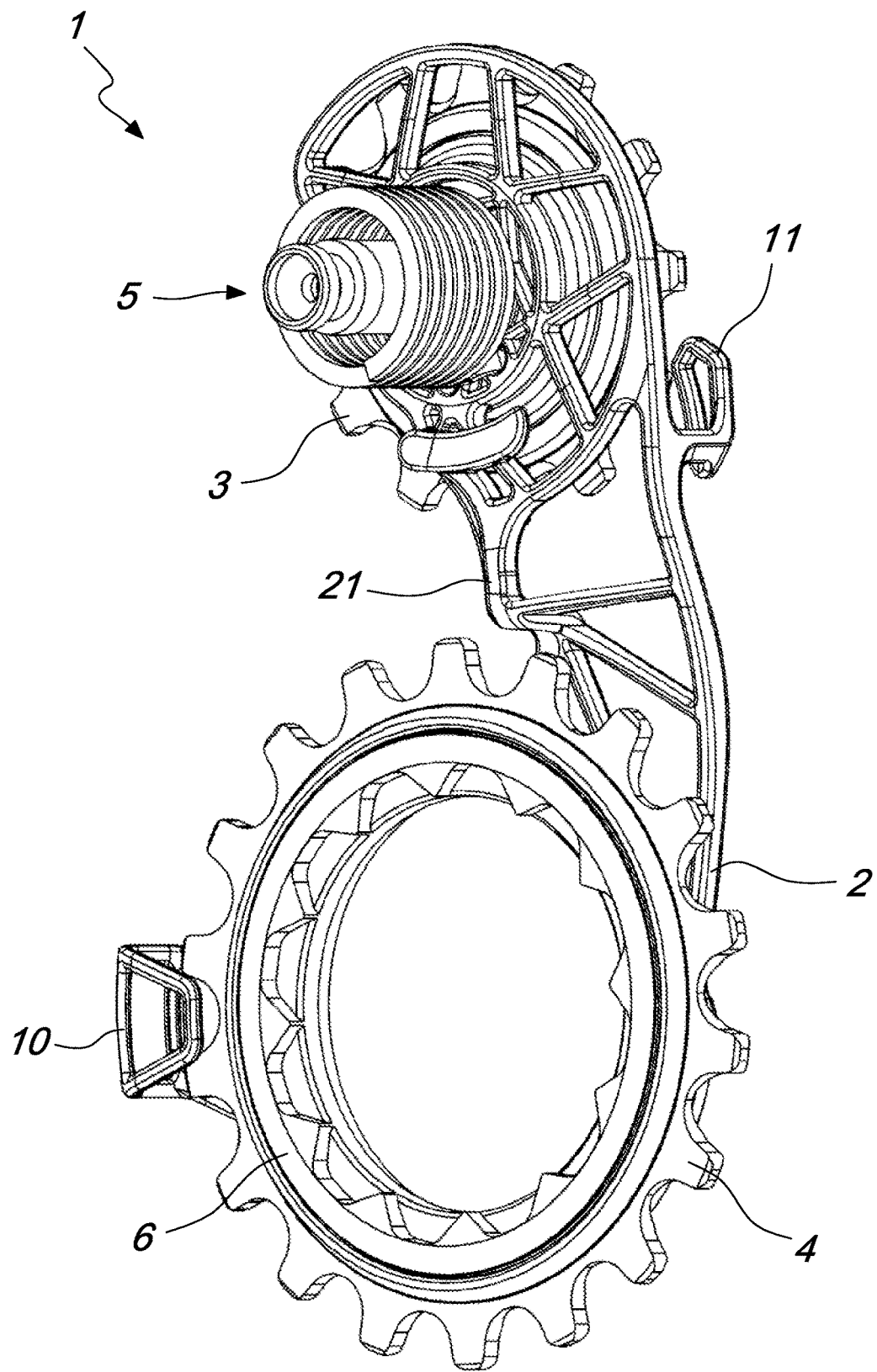
FIG. 1 is a perspective view of a first embodiment of a chain guide for a bicycle seen from the outer side (i.e. from the side remote from the bicycle), wherein the cage is devised as a single-plate cage.
Figure 2:
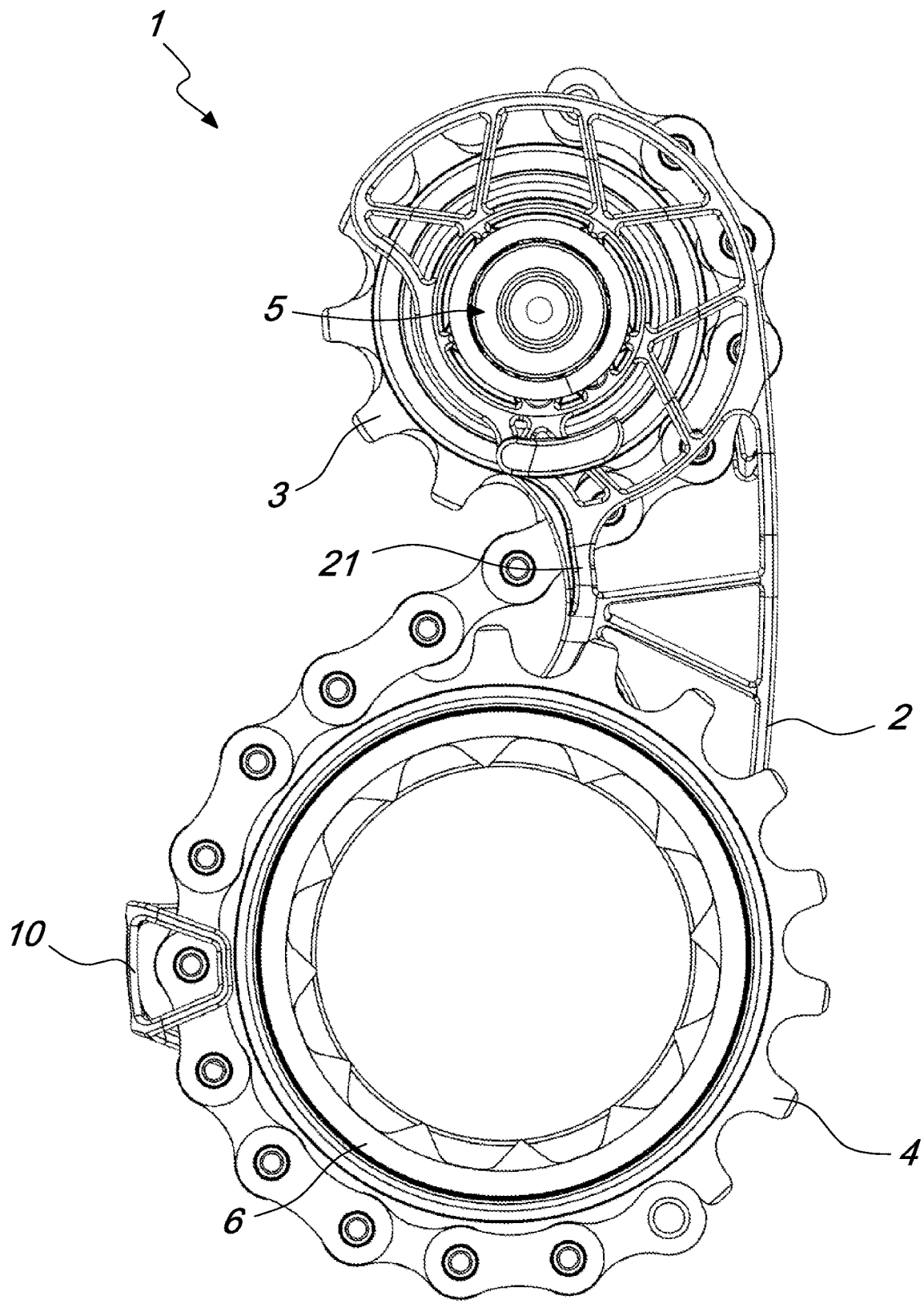
FIG. 2 is a corresponding plan view of the chain guide of FIG. 1 showing also a part of a guided bicycle chain.
Figure 3:
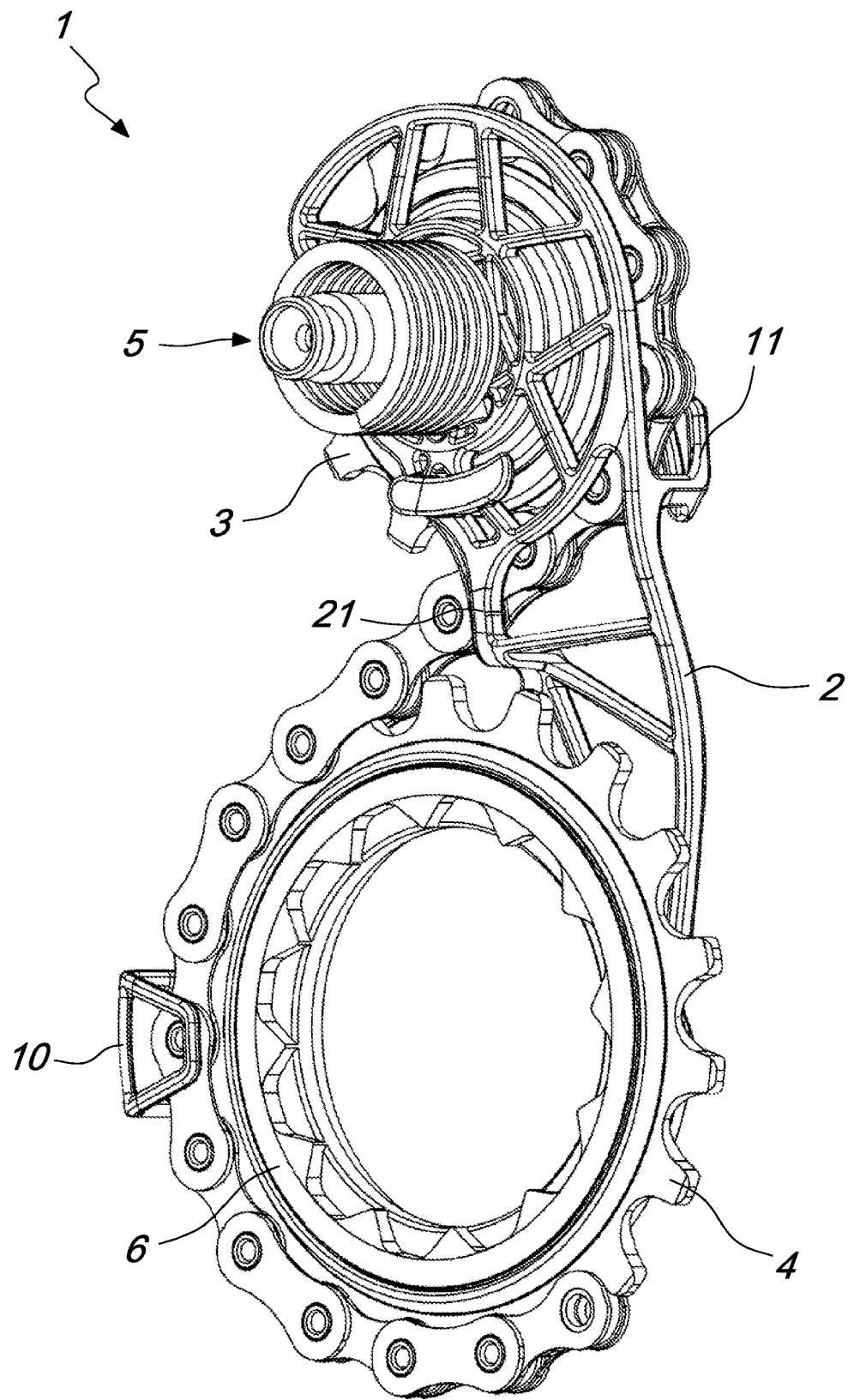
FIG. 3 is a perspective view of the chain guide of FIG. 1 further showing the part of the guided bicycle chain.
Figure 4:
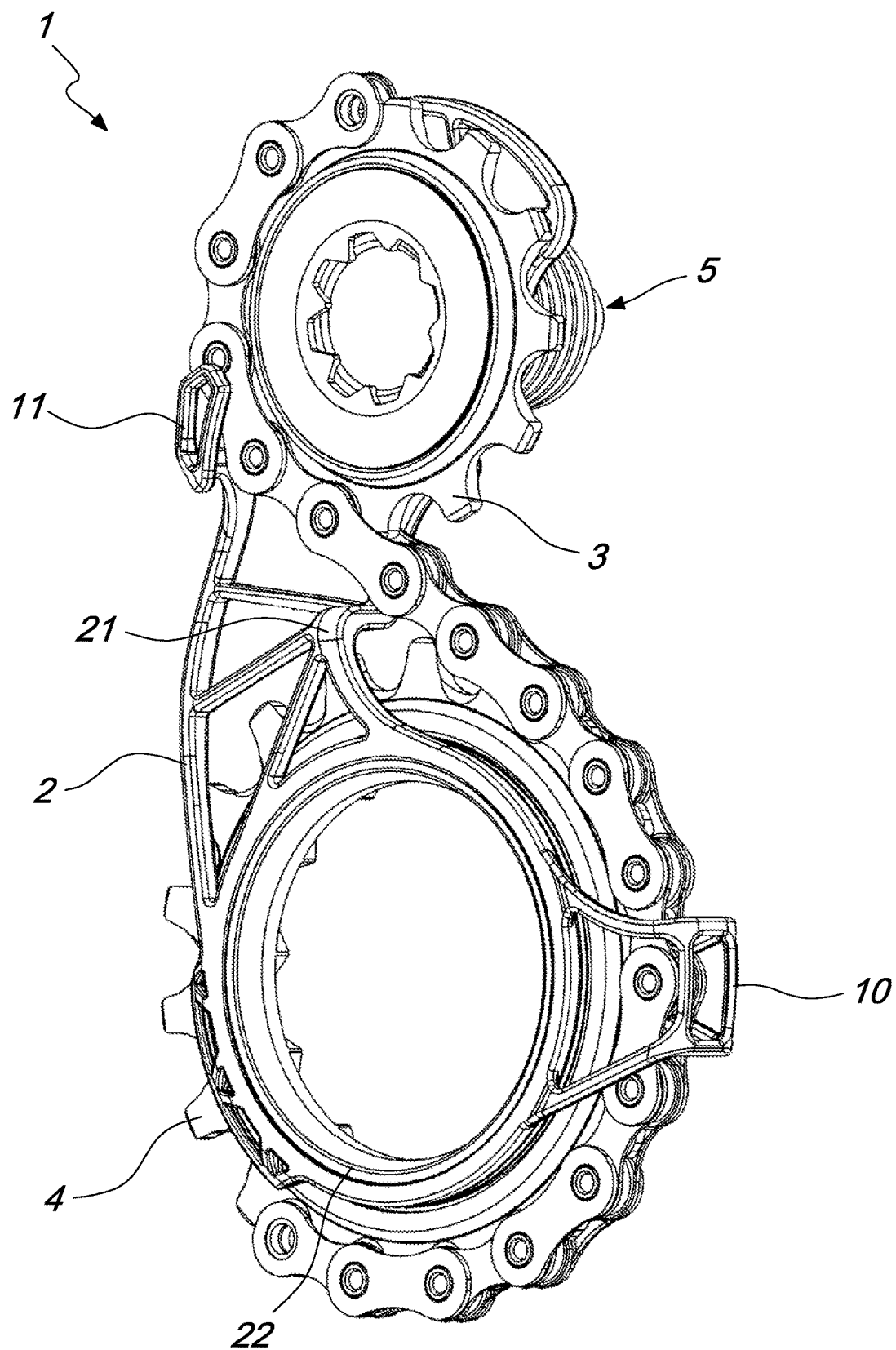
FIG. 4 is a perspective view of the chain guide of FIG. 1 further showing the part of the guided bicycle chain from the inner side (i.e. from the bicycle side)

With reference to the accompanying figures, FIGS. 1 to 8 show a first embodiment of a chain guide for a rear derailleur for a bicycle, wherein the chain guide includes a single-plate cage. As shown in said figures, a chain guide 1 comprises a cage 2, a guide pulley 3 rotatably mounted on the cage 2, a tension pulley 4 rotatably mounted to the cage 2, and means 5 for connecting the chain guide 1 to a movable member of a rear derailleur (not shown) so as to move the chain guide 1 with respect to the bicycle in a manner well-known to the person skilled in the art which will not be described hereinafter. With respect to the latter, reference is made for instance to the pertinent teachings of EP 1 568 592 B1 which are herewith incorporated by reference. The guide pulley 3 and the tension pulley 4 are toothed to be engageable with a bicycle chain in a manner also well-known to the person skilled in the art.

The cage 2 is an elongated and partially planar member having a plurality of cutouts which reduce weight and give it a filigree appearance. Advantageously the cage 2 is embodied as a single-plate cage and has an S-shaped transition 21 section which is discussed hereinbelow. The cage 2 is additionally provided advantageously with a first chain guide element 10 and a second chain guide element 11 which are preferably U-shaped.

Figure 6:
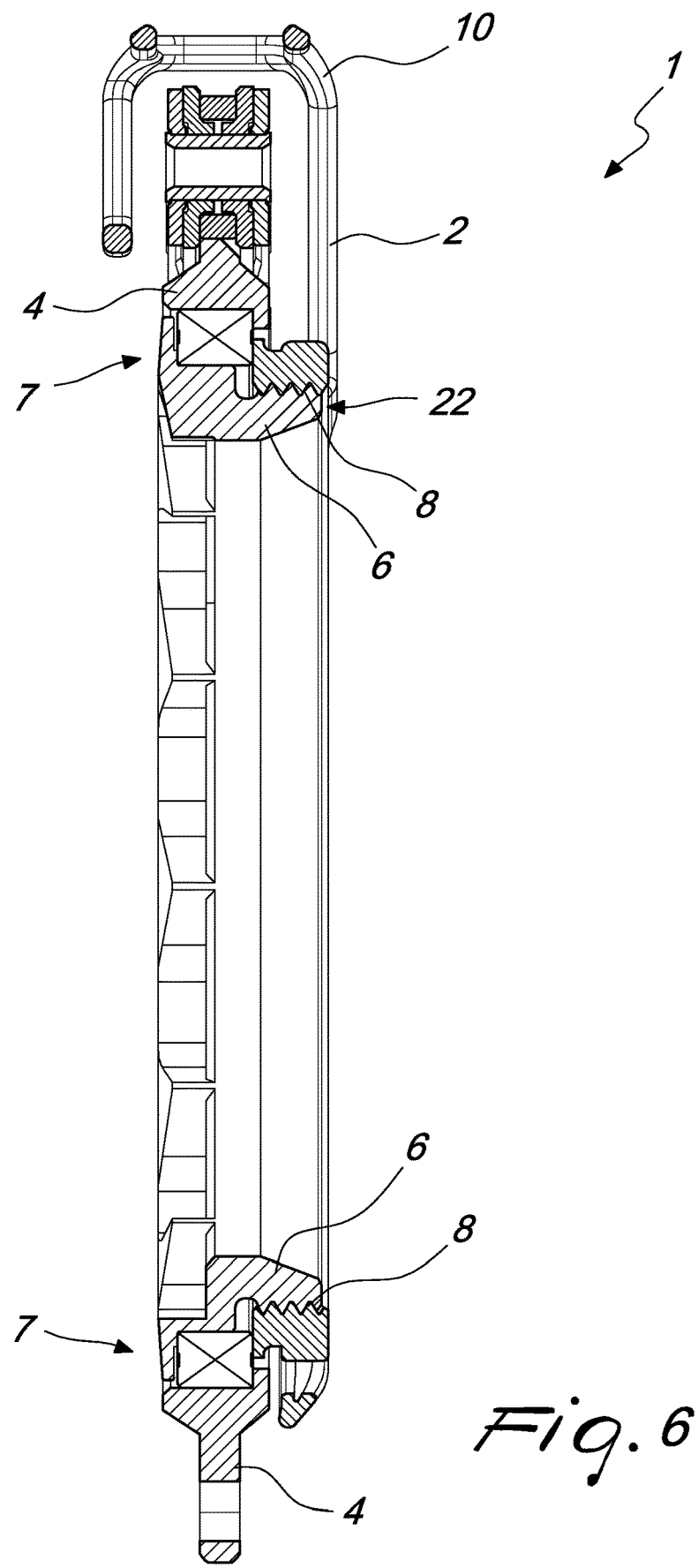
FIG. 6 is a partially sectional view of a tension pulley region of the chain guide of FIG. 1.
Figure 7:
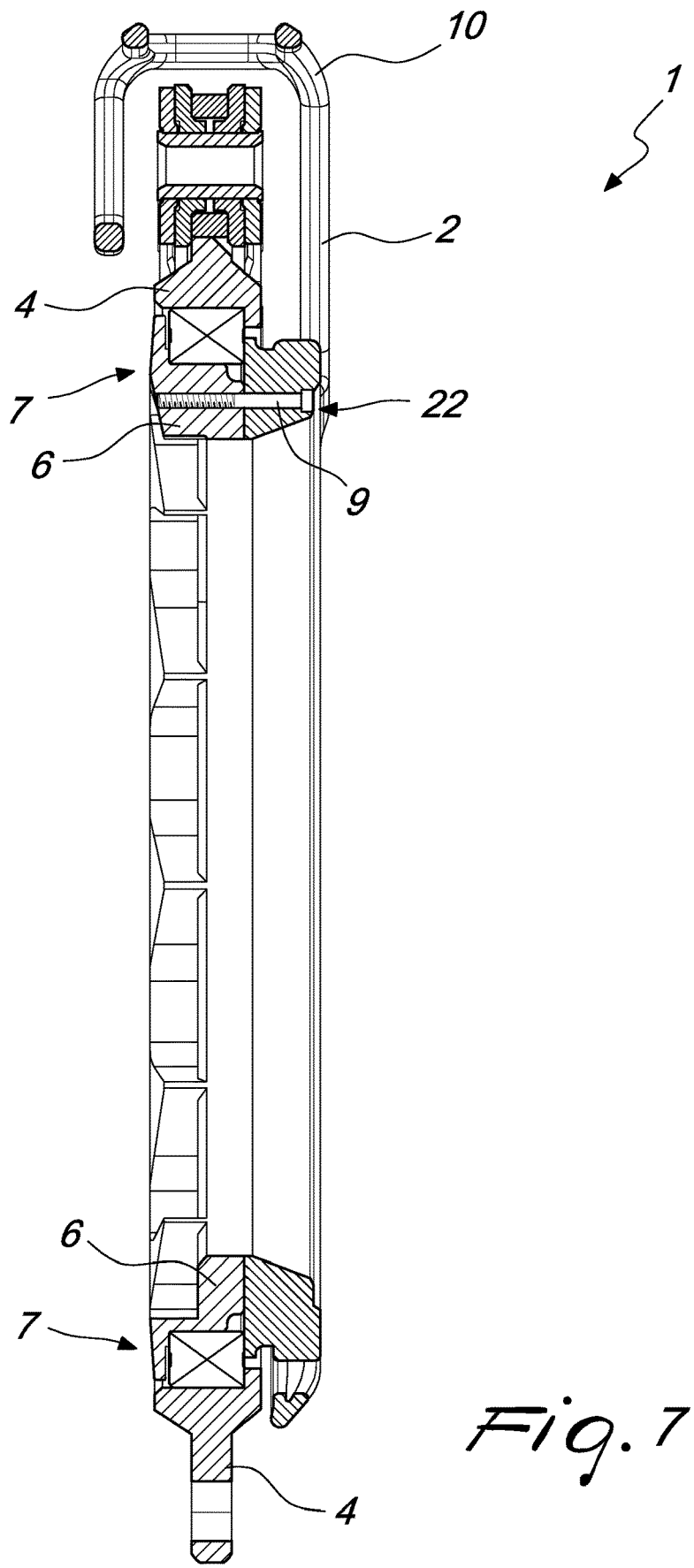
FIG. 7 is a partially sectional view of a tension pulley region alternative to FIG. 6.

As shown in FIGS. 6 and 7 the tension pulley 4 is ring-shaped and is rotatably mounted to the cage 2 by a mounting means comprised preferably of a circular lockring 6 and by an interposed bearing 7 arranged so as to leave preferably a free opening in the center of the tension pulley 4 in its mounted state. The bearing 7 will be discussed hereinbelow in more detail. While the opening may be left free it is conceivable to position a cap or the like to cover the opening completely or partially.

The cage 2 has a circular mounting opening 22 formed by an integrally or otherwise connected part of the cage 2. As shown in FIG. 6, the circular mounting opening 22 has an inner circumferential thread 8, and the lockring 6 has a corresponding outer circumferential thread engaged with the thread 8. Alternatively, as shown in FIG. 7, the lockring 6 may be mounted to the cage 2 by one or more circumferentially distributed bolts 9. The preferred number of bolts 9 is at least equal to two. If the number of bolts 9 is equal to 3 they may be distributed along a circular arc of 120°. Nevertheless, the person skilled in the art will appreciate that the number and distribution of the bolts can be varied according to the materials used, constructive constraints, operational area of the bicycle etcetera.

The bearing 7 may be a conventional bearing, as shown, including inner and outer races as well as balls or rollers between the races.

According to a further variation, which is applicable to all embodiments of the invention, the inner and outer races of the bearing may be formed by a part of the lockring or lockrings (or the cage if no lockring or lockrings are used) and the inner face of the ring-shaped tension pulley, respectively (e.g. for creating a sliding bearing). The rollers or balls of the bearing are interposed between the races.

In such further variations, the lockring protruding axially from the cage and the opening therein forms preferably an inner race for the balls or rolls. A corresponding outer race of the bearing 7 may be preferably formed by a cylindrical inner face of the ring-shaped tension pulley.

By way of example, with specific reference to the alternatives of the first embodiment of FIGS. 6 and 7, the lockring 6 protrudes axially somewhat from the cage 2 while forming a radial shoulder which—in cooperation with an opposite radial shoulder at the tension pulley 4—holds the tension pulley 4 rotatably mounted to the cage 2. The embodiments without lockrings or the radial shoulder may be provided by the cage or cages.

Figure 5:
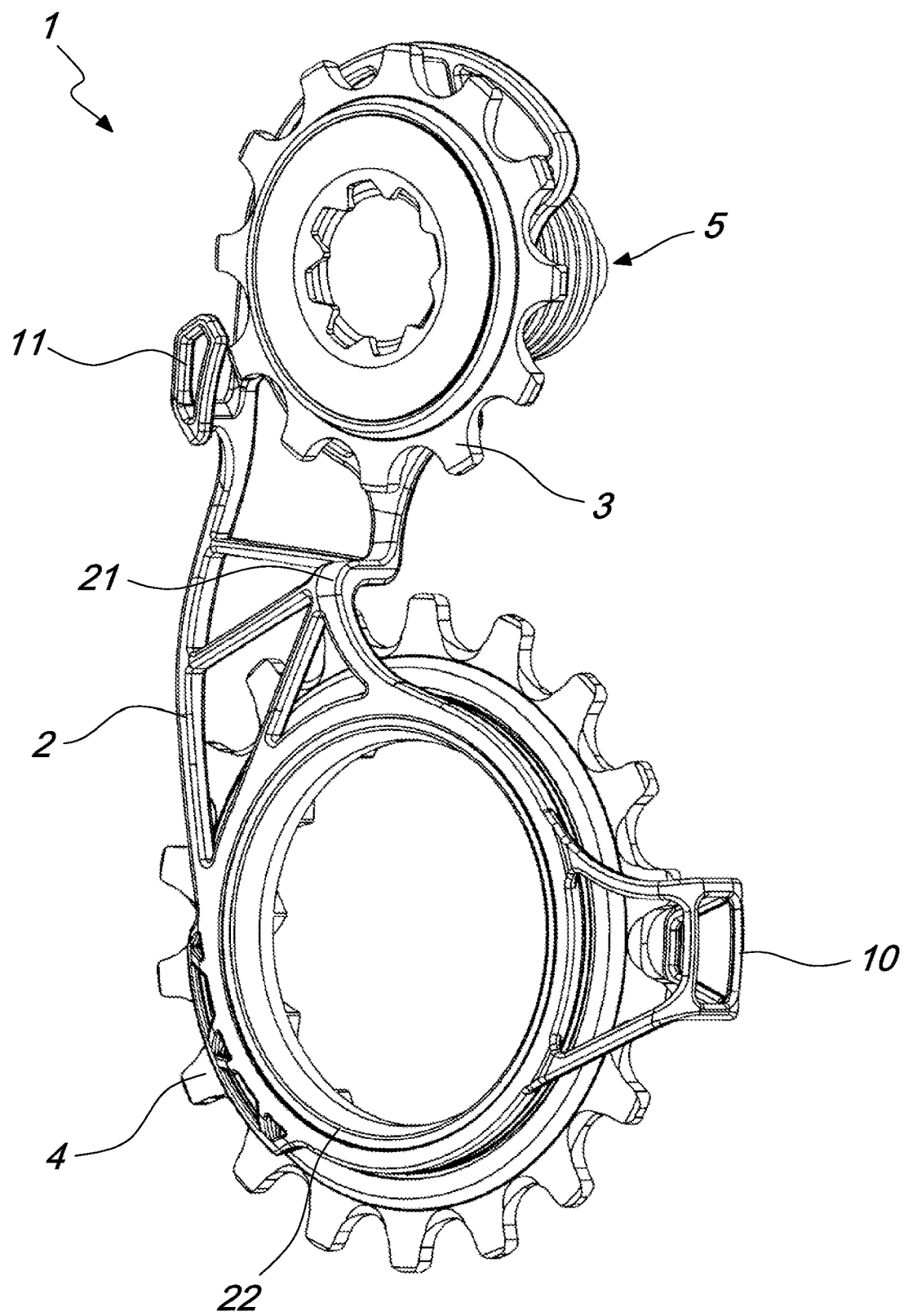
FIG. 5 is a perspective view of the chain guide of FIG. 4 without the guided bicycle chain from the inner side.
Figure 8:
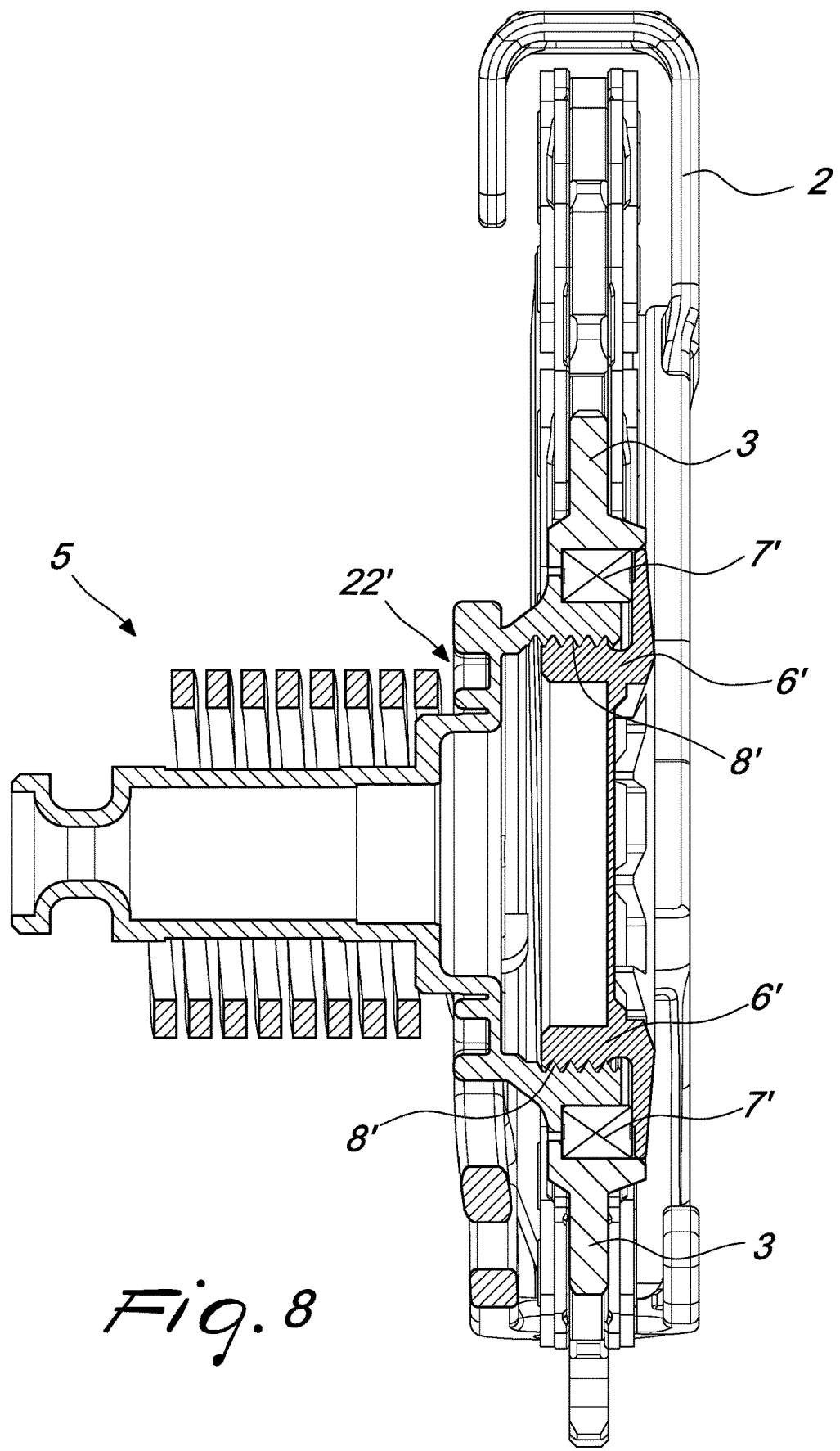
FIG. 8 is a partially sectional view of a guide pulley region of the chain guide.

With particular reference to FIGS. 5 and 8, also the guide pulley 3 is rotatably mounted to the cage 2 by mounting means 6' and an interposed bearing 7' wherein the mounting means are arranged so as to be spaced from the center of rotation of the guide pulley 3. To this end, the cage 2 has a second circular mounting opening 22' formed by an integrally or otherwise connected part of the cage 2. The second circular mounting opening 22' mounts the guide pulley 3 in a similar way as described above for the tension pulley 4, for instance via a circular lockring 6' provided with threads 8' or a lockring with bolts (not shown). Also, in this case, the bearing 7' can be implemented as a ball bearing or a roller bearing or sliding bearing with inner and outer races as described in connection with the tension pulley 4.

For both types of pulleys and in all embodiments of the invention, the balls or rollers and races of the bearings could be metallic (steel), as is most common, or it may be preferable to make them from ceramics, in order to be dry-running, lubrication-free, corrosion-resistant and maintenance-free and to always present a good look. Alternatively, roller bearings having plastic rollers or ball bearings having plastic balls may be applicable.

As an alternative to the foregoing bearings, a low friction and drag bearing may be implemented also as a sliding bearing, for example as a sleeve bushing made from plastic, polymer, metal composite or ceramic. Such sliding bearings are dry-running and lubrication-free, low-weight, corrosion-resistant and maintenance-free and therefore particularly advantageous.

The free space in the center of the guide pulley 3 may also be an opening in the form of a blind hole, or it may have the form of a lockring that is not hollow inside to protect the blind hole from contamination. Also a separate cap to cover the free opening totally or partially is conceivable. A lockring that is not hollow inside or is covered by a cap advantageously improves the aerodynamics.

The free space in the center of the tension pulley 4 may be an opening in the form of a through hole which facilitates the cleaning of the chain guide.

With reference again to FIGS. 1 to 5, the cage 2 includes a transition section 21 which is partially S-shaped and extends from one side of the common plane of the co-planar pulleys 3, 4 to the other side. The ends of the S-shape are extended linear in opposite directions where the circular mounting opening 22 for the tension pulley 4 and the circular mounting opening for the guide pulley 3 are provided on the left and right, respectively, of the plane of the respective pulleys 3, 4.

The S-shaped transition section 21 advantageously allows devising the cage 2 out of a single plate with the pulleys 3, 4 mounted on opposing sides of the single plate. The S-shaped transition section 21 allows the passage of the bicycle chain from the guide pulley 3 to the tension pulley 4 as the pulleys 3, 4 are mounted on opposite sides of the single plate. The cage 2 devised as above advantageously avoids the use of two-plate cages, as is the case in the above-described prior art, and further simplifies the cage construction. In addition, material/weight is saved and the cage is better accessible for cleaning.

Figure 9:
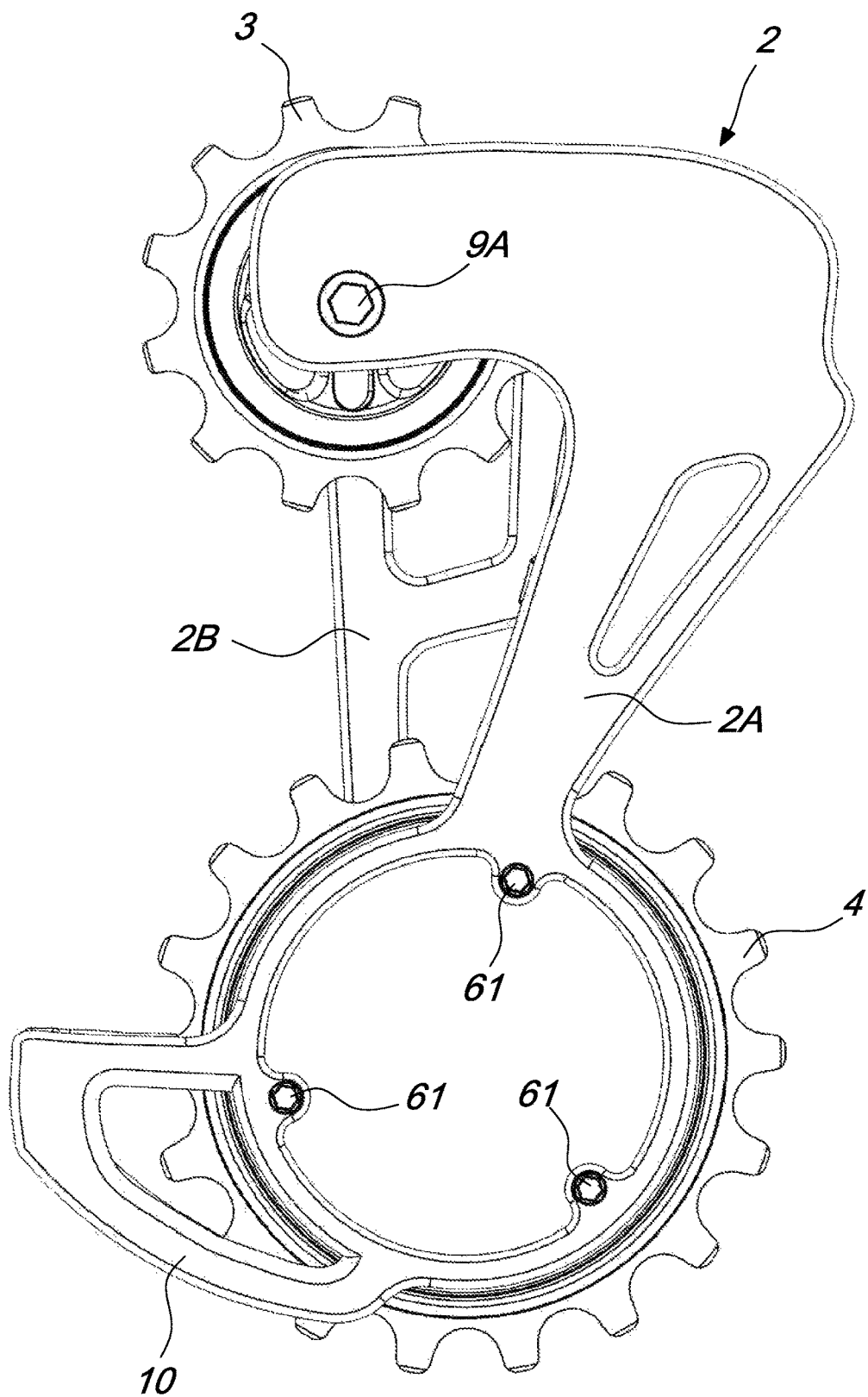
FIG. 9 is a plan view of a second embodiment of a chain guide for a bicycle seen from the outer side (i.e. from the side remote from the bicycle), wherein the cage is devised as a two-plate cage.
Figure 10:
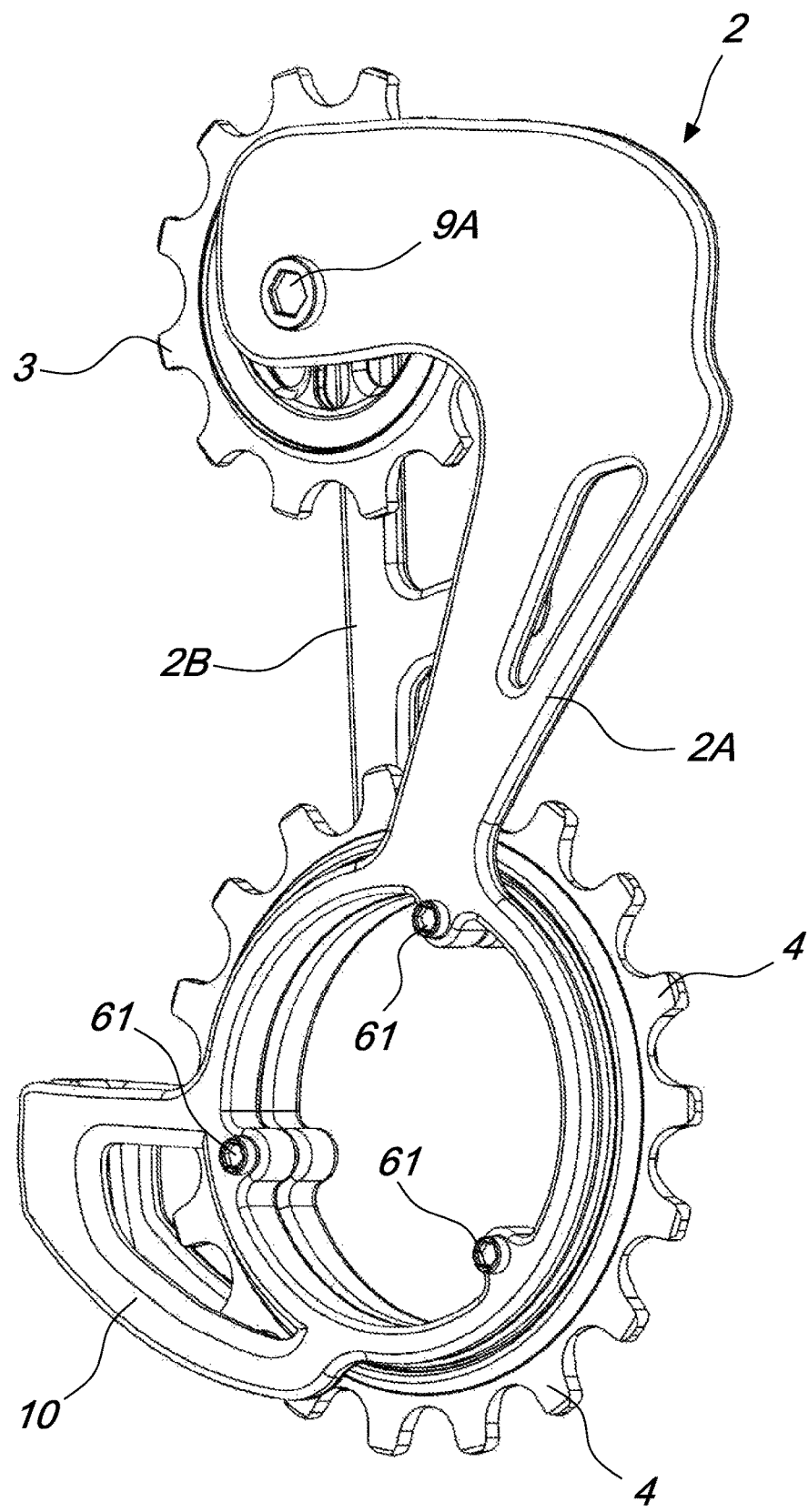
FIG. 10 is a corresponding perspective view of the chain guide of FIG. 9.
Figure 11:
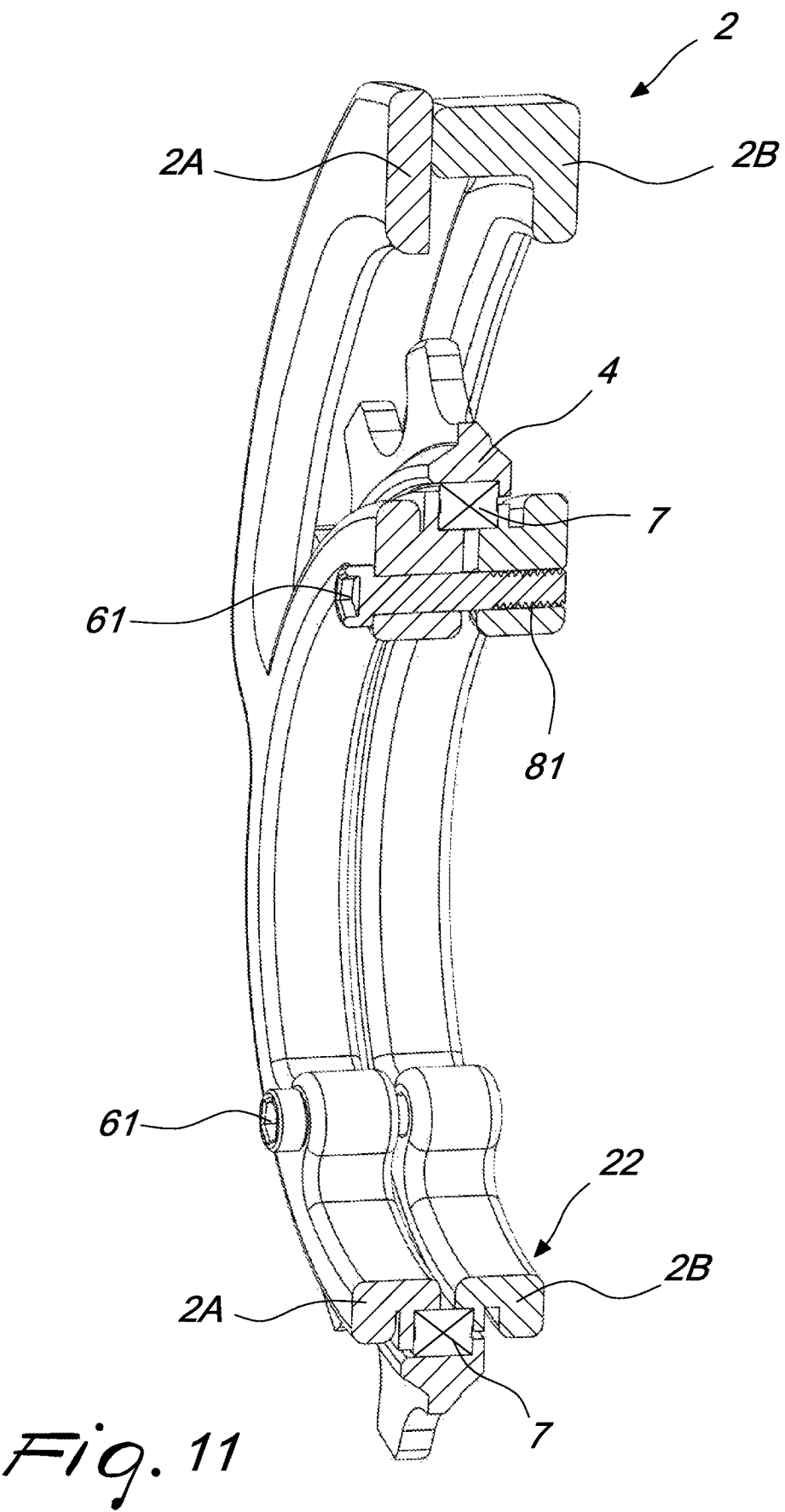
FIG. 11 is a partially sectional view of a tension pulley region of the chain guide of FIG. 9.

With reference to FIGS. 9 to 11 a second embodiment of the present invention is described which is embodied by a two-part cage 2 having an outer cage 2A which faces away from the bicycle and an inner cage 2B which faces towards the bicycle.

To the extent that same elements are shown in the second embodiment and in the first embodiment, the reference numerals are also the same and their description will be omitted if not necessary.

In the second embodiment, the mounting means of the tension pulley 4 are embodied as at least one locking bolt indicated by reference numeral 61. The preferred number of locking bolts is at least equal to two. In the shown embodiment the number of the locking bolts 61 is equal to three and they are distributed along a circular arc of 120°. Nevertheless, the person skilled in the art will appreciate that the number and distribution of the locking bolts can be varied according to the materials used, constructive constraints, operational area of the bicycle etcetera.

With further reference to FIGS. 9 to 11, in particular to FIG. 11, the locking bolt(s) 61 connects/connect the outer and inner cages 2A and 2B by means of respective threads 81, such that in the assembled state of the cages 2A and 2B the same form a circumferential guide or notch which accommodates the bearing 7.

In the embodiment of FIGS. 9 to 11 the guide pulley 3 is mounted in a conventional manner by using a single central bolt designated by reference numeral 9A. Nevertheless, also in this embodiment the guide pulley 3 can be mounted in a manner similar to the tension pulley 4 described above.

Figure 12:
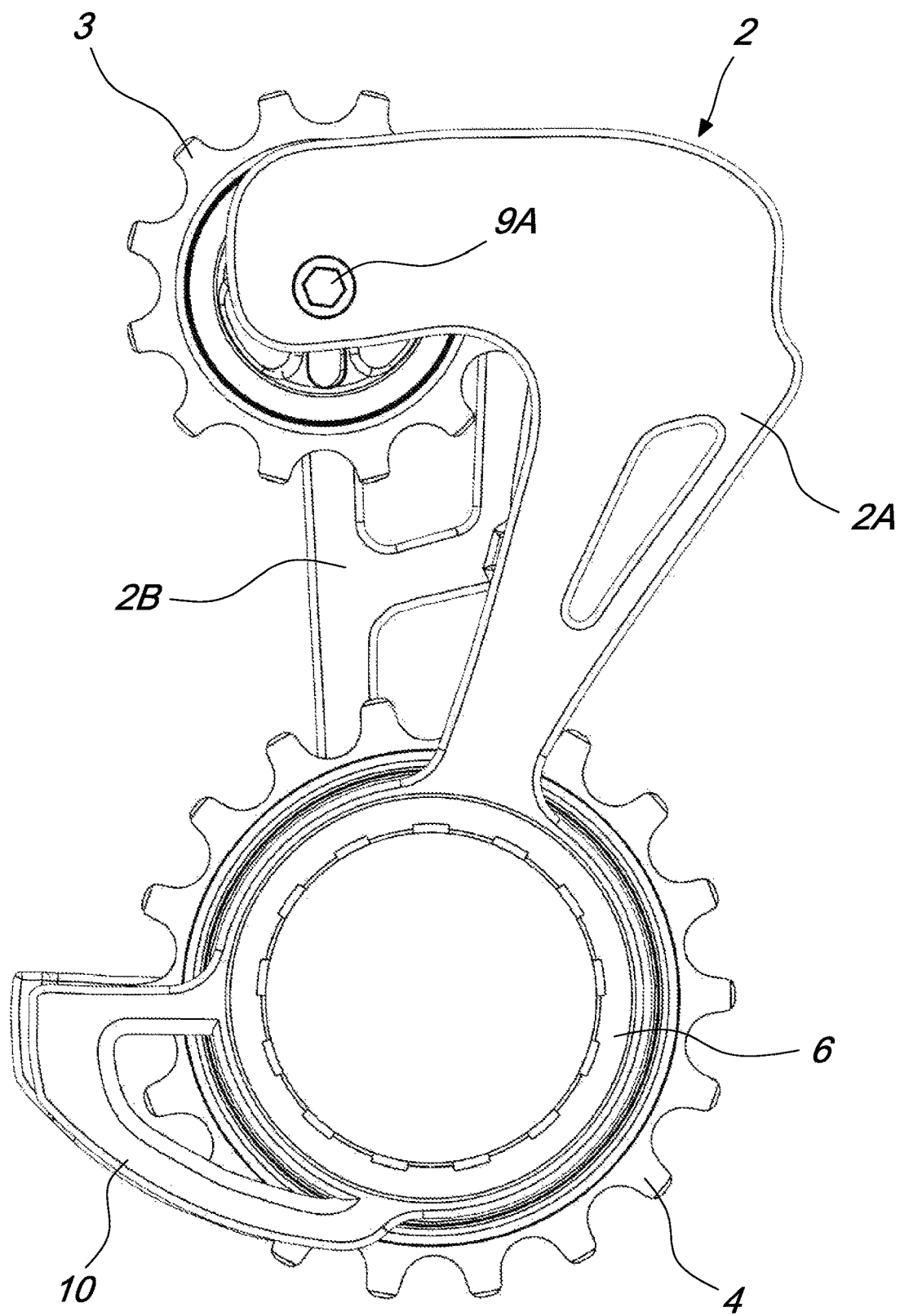
FIG. 12 is a plan view of a third embodiment of a chain guide for a bicycle seen from the outer side (i.e. from the side remote from the bicycle), wherein the cage is devised as a two-plate cage.
Figure 13:
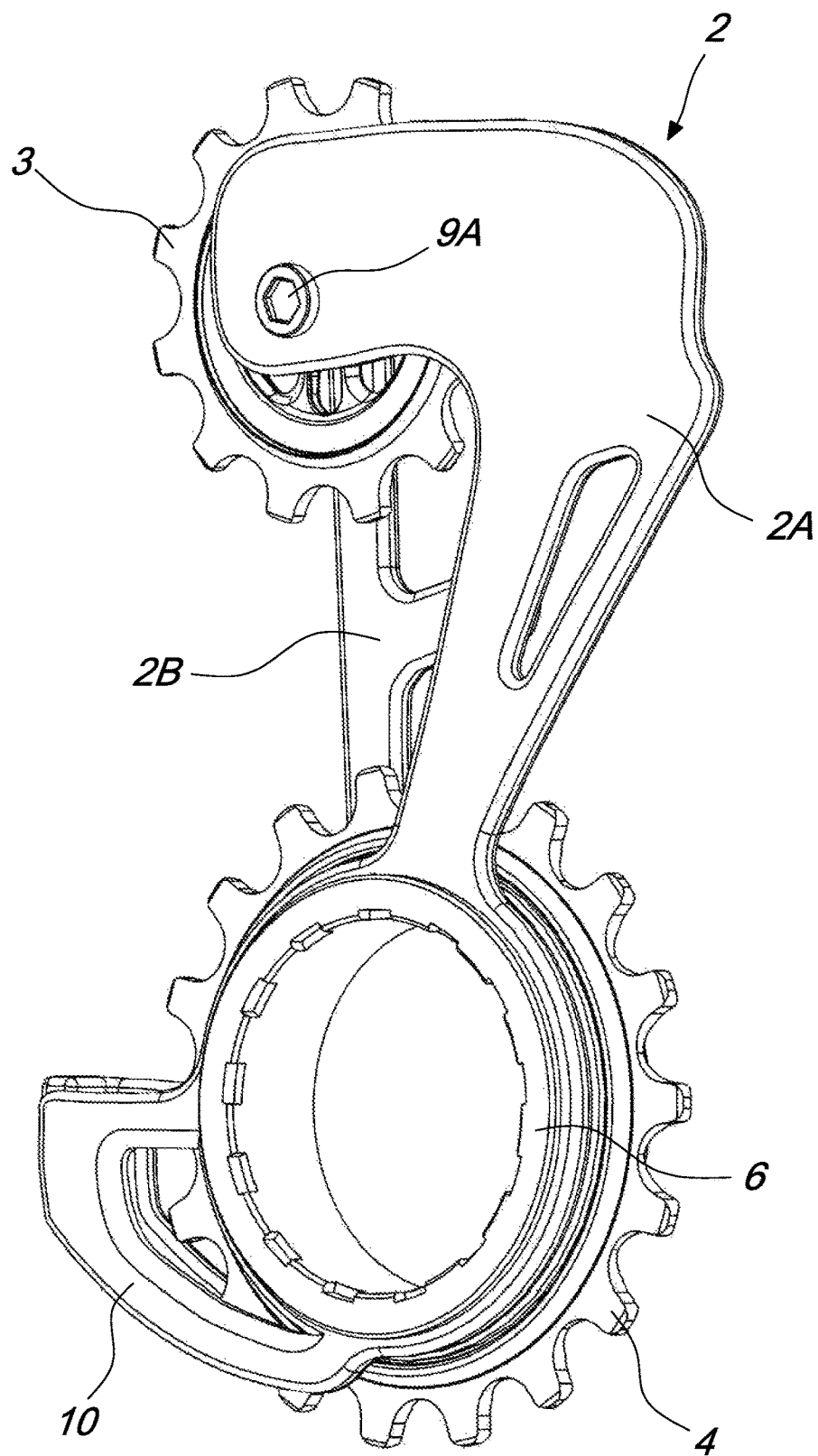
FIG. 13 is a corresponding perspective view of the chain guide of FIG. 12.
Figure 14:
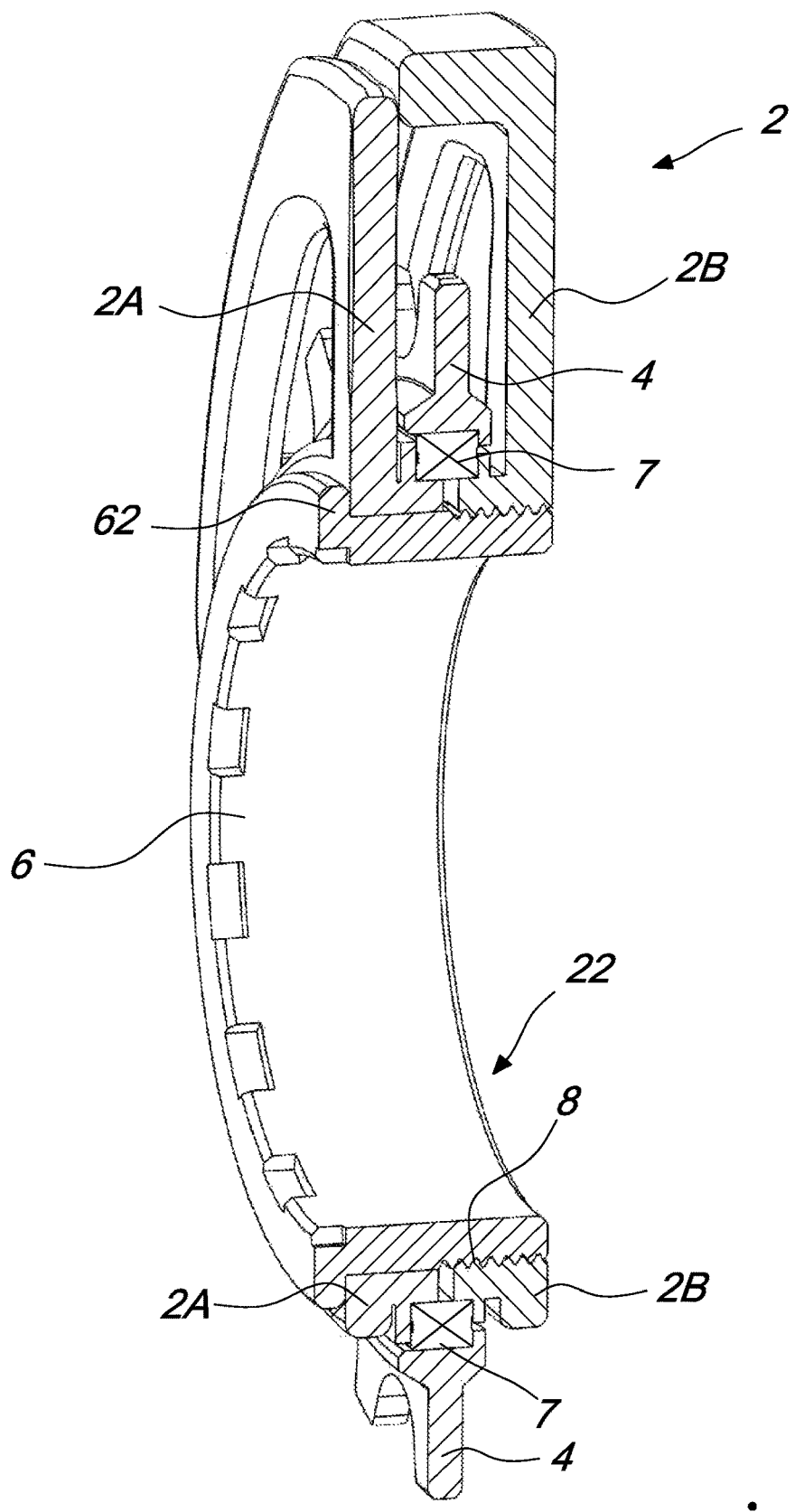
FIG. 14 is a partially sectional view of a tension pulley region of the chain guide of FIG. 12.

With reference to FIGS. 12 to 14 a third embodiment of the present invention is described which is also embodied by a two-part cage 2 having an outer cage 2A which faces away from the bicycle and an inner cage 2B which faces towards the bicycle.

To the extent that same elements are shown in the third embodiment as in the first and second embodiments, the reference numerals are also the same and their description will be omitted if not necessary.

In the third embodiment, the mounting means of the tension pulley 4 are embodied as a single lockring indicated by reference numeral 6. The lockring 6 is threaded by means of the thread 8 to the inner cage 2B. However, the construction can be inverted, such that the lockring 6 is threaded to the outer cage 2A. The inner and outer cages 2B and 2A are held firmly between a shoulder 62 of the lockring 6 and the thread 8. In this embodiment it is also possible to replace the thread 8 by bolts in a manner similar to the first embodiment.

With further reference to FIGS. 12 to 14, in particular to FIG. 14, the lockring 6 connects the outer and inner cages 2A and 2B, such that in the assembled state of the cages 2A and 2B the same form a circumferential guide or notch which accommodates the bearing 7.

In the embodiment of FIGS. 12 to 14 the guide pulley 3 is also mounted in a conventional manner by using a single central bolt designated by reference numeral 9A. Nevertheless, also in this embodiment the guide pulley 3 can be mounted in a manner similar to the tension pulley 4 described above.

Figure 15:
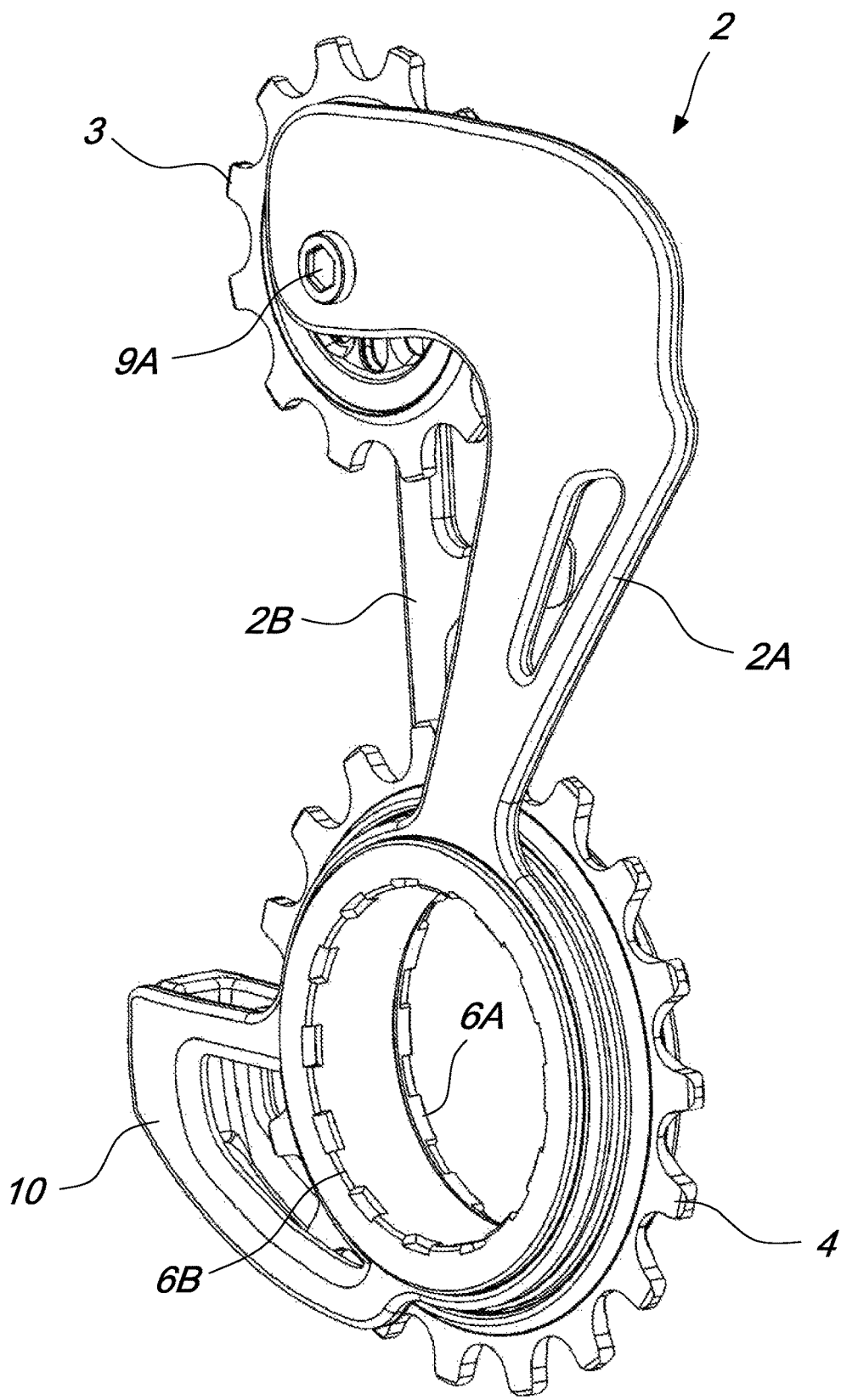
FIG. 15 is a perspective view of a fourth embodiment of a chain guide for a bicycle seen from the outer side (i.e. from the side remote from the bicycle), wherein the cage is devised as a two-plate cage.
Figure 16:
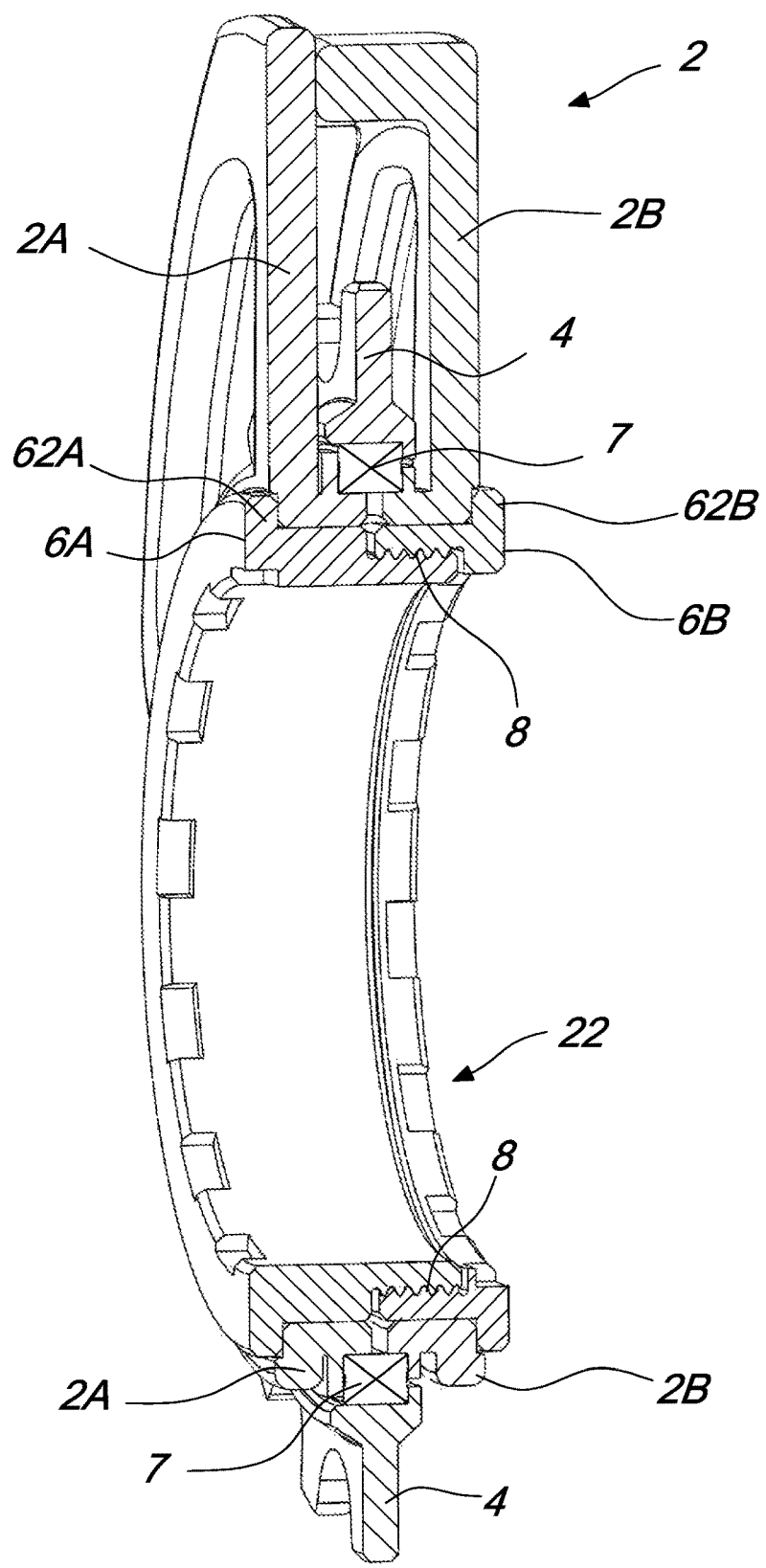
FIG. 16 is a partially sectional view of a tension pulley region of the chain guide of FIG. 15.

With reference to FIGS. 15 and 16 a fourth embodiment of the present invention is described which is also embodied by a two-part cage 2 having an outer cage 2A which faces away from the bicycle and an inner cage 2B which faces towards the bicycle.

To the extent that same elements are shown in the third embodiment as in the first and second embodiments, the reference numerals are also the same and their description will be omitted if not necessary.

In the third embodiment, the mounting means of the tension pulley 4 are embodied as at least two lockrings indicated by reference numerals 6A and 6B. The lockrings 6A and 6B are threaded to one another by means of the thread 8. The inner and outer cages 2B and 2A are held firmly between respective shoulders 62A and 62B of the lockrings 6A and 6B. In this embodiment it is also possible to replace the thread 8 by bolts in a manner similar to the first or third embodiments.

With further reference to FIGS. 15 and 16, in particular to FIG. 16, the lockrings 6A and 6B connect the outer and inner cages 2A and 2B, such that in the assembled state of the cages 2A and 2B the same form a circumferential guide or notch which accommodates the bearing 7.

In the embodiment of FIGS. 15 and 16 the guide pulley 3 is also mounted in a conventional manner by using a single central bolt designated by reference numeral 9A. Nevertheless, also in this embodiment the guide pulley 3 can be mounted in a manner similar to the tension pulley 4 described above.

Figure 17:
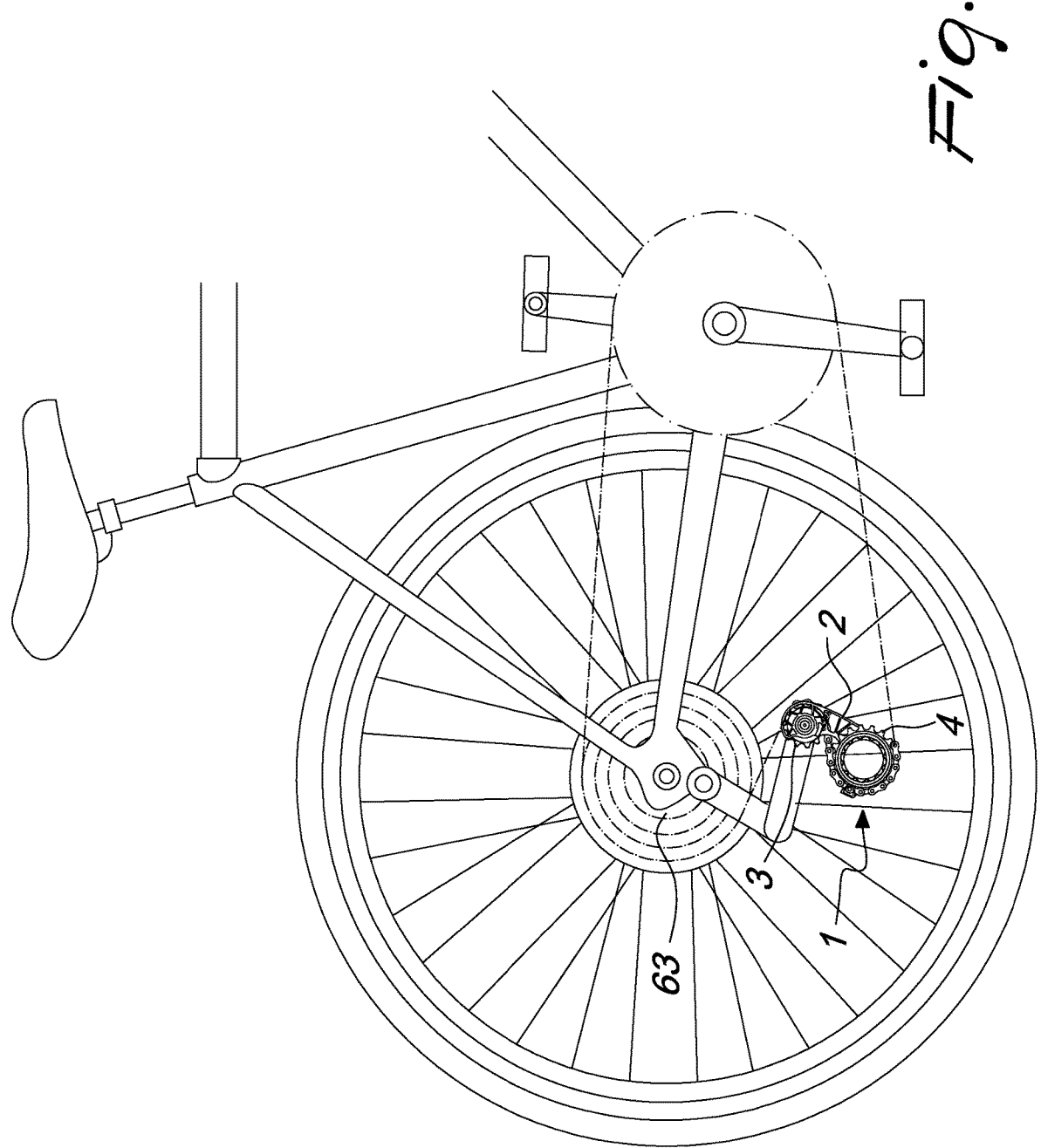
FIG. 17 is a schematic view of the rear part of a bicycle having a derailleur which is equipped with a chain guide as shown in FIGS. 1 to 16.

FIG. 17 shows the mounting position of the chain guide 1 on a bicycle. The rest of the derailleur including the pulleys 3 and 4 and the cage 2 is shown only schematically. The cassette is shown at reference number 63.

The disclosure of the present invention includes all modifications and equivalents of the subject matter recited in the claims appended hereto as permitted by applicable law. Moreover, any combination of the above-described elements in all possible variations thereof is encompassed by the disclosure unless indicated otherwise herein.

Where technical features mentioned in any claim are followed by reference signs, the reference signs have been included for the sole purpose of increasing the intelligibility of the claims and accordingly, neither the reference signs nor their absence have any limiting effect on the technical features as described above or on the scope of any claim elements.

One skilled in the art will realize the disclosure may be embodied in other specific forms without departing from the disclosure or essential characteristics thereof. The foregoing embodiments are therefore to be considered illustrative rather than limiting to the disclosure described herein in all respects. The scope of the invention is thus indicated by the appended claims, rather than the foregoing description, and all changes that come within the meaning and range of equivalence of the claims are therefore intended to be embraced therein.

LIST OF REFERENCES 1 chain guide
2 cage
2A outer cage
2B inner cage
3 guide pulley
4 tension pulley
5 means for connecting the chain guide to a movable member of a derailleur 6 mounting means/lockring of the tension pulley
6' mounting means/lockring of the guide pulley
61 mounting means/locking bolt
81 thread of the locking bolt
6A mounting means/lockring of the tension pulley in the two-part cage
6B mounting means/lockring of the tension pulley in the two-part cage
7 bearing of the tension pulley
7' bearing of the guide pulley
8 circumferential thread of the circular mounting means/lockring of the tension pulley
8' circumferential thread of the circular mounting means/lockring of the guide pulley
9 bolts
9A central bolt of the guide pulley
10 first chain guide element
11 second chain guide element
21 S-shaped transition portion
22 circular mounting opening for the tension pulley
22' circular mounting opening for the guide pulley
62 shoulder of the lockring
62A shoulder of the outer cage
62B shoulder of the inner cage
63 cassette

The invention claimed is:

1. A chain guide for a bicycle rear derailleur comprising a cage, a guide pulley rotatably mounted to the cage, a circular tension pulley rotatably mounted to the cage, and chain guide mounting section for connecting the chain guide to a movable member of a rear derailleur so as to move the chain guide with respect to a bicycle cassette, wherein the guide pulley and the tension pulley are adapted to be engageable with a bicycle chain and wherein the tension pulley is rotatably mounted to the cage by mounting means and an interposed bearing, wherein the mounting means of the tension pulley are arranged so as to be spaced from the center of rotation of the tension pulley and wherein the mounting means are stationary in respect to the cage in the mounted state of the chain guide.

2. The chain guide according to claim 1, wherein the mounting means include at least one lockring.

3. The chain guide according to claim 1, wherein the mounting means include a lockring and wherein the lockring is provided with a circumferential thread for threading engagement with the cage.

4. The chain guide according to claim 1, wherein the mounting means include a lockring and wherein the chain guide further includes at least one bolt passing through the lockring for threading engagement with the cage.

5. The chain guide according to claim 1, wherein the cage includes an outer cage and an inner cage, wherein the tension pulley is rotatably held between the outer cage and the inner cage and wherein the mounting means include at least one locking bolt for connecting the outer cage and the inner cage, such as to rotatably hold the tension pulley with the interposed bearing in the cage.

6. The chain guide according to claim 1, wherein the cage includes an outer cage and an inner cage, wherein the tension pulley is rotatably held between the outer cage and the inner cage and wherein the mounting means include at least one lockring for connecting the outer cage and the inner cage, such as to rotatably hold the tension pulley with the interposed bearing in the cage.

7. The chain guide according to claim 6, wherein the mounting means include a lockring and wherein the lockring is provided with a circumferential thread for threading engagement with one of the outer and the inner cage.

8. The chain guide according to claim 6, wherein the mounting means include two lockrings and wherein each of the lockrings is provided with a respective circumferential thread for mutual threading engagement thereof.

9. The chain guide according to claim 1, wherein the guide pulley is rotatably mounted to the cage by a further mounting means and a further interposed bearing, wherein preferably the further mounting means of the guide pulley are arranged so as to be spaced from the center of rotation of the guide pulley, and wherein preferably the further mounting means include a lockring.

10. The chain guide according to claim 1, wherein the guide pulley is rotatably mounted to the cage by a further mounting means and a further interposed bearing, wherein the tension pulley and the guide pulley are provided on a common plane in the mounted state thereof and wherein the mounting means for the tension pulley and the further mounting means for the guide pulley are provided partially on the common plane of the tension pulley and the guide pulley.

11. The chain guide according to claim 1, wherein the tension pulley and the guide pulley are provided on a common plane in the mounted state thereof, wherein the cage is formed of a single plate and wherein the tension pulley and the guide pulley are mounted on opposing sides of the single plate.

12. The chain guide according to claim 1, wherein the cage includes a circular mounting opening for the tension pulley; and/or wherein the cage includes a circular mounting opening for the guide pulley.

13. The chain guide according to claim 10, wherein the cage includes a circular mounting opening for the tension pulley and wherein the cage includes a circular mounting opening for the guide pulley, wherein the circular mounting opening for the tension pulley and the circular mounting opening for the guide pulley are provided on opposite sides of the common plane of the tension pulley and the guide pulley, and wherein the cage further includes a transition section which is partially S-shaped as seen from a distant point lying on the common plane of the tension pulley and the guide pulley, wherein preferably the S-shaped transition section is devised so as to allow the passage of the bicycle chain from the guide pulley to the tension pulley.

14. The chain guide according to claim 1, wherein the bearing is a ball or roller bearing or sliding bearing, wherein preferably the bearing is a ceramic bearing or a steel bearing.

15. The chain guide according claim 1, wherein the bearing of the tension pulley includes an inner race which is formed by a protruding part of the mounting means thereof and/or an outer race which is formed by a cylindrical inner face of the tension pulley and/or wherein the bearing of the guide pulley includes an inner race which is formed by a protruding part of the mounting means thereof and/or an outer race which is formed by a cylindrical inner face of the guide pulley.

16. The chain guide according to claim 1, wherein the mounting means include at least one lockring and wherein the bearing of the tension pulley includes an inner race which is formed by a portion of the lockring and/or an outer race which is formed by a cylindrical inner face of the tension pulley and/or wherein the bearing of the guide pulley includes an inner race which is formed by a protruding part of the mounting means thereof and/or an outer race which is formed by a cylindrical inner face of the guide pulley.

17. Bicycle rear derailleur having a chain guide according to claim 1.

18. The chain guide according to claim 11, wherein the cage includes a circular mounting opening for the tension pulley and wherein the cage includes a circular mounting opening for the guide pulley, wherein the circular mounting opening for the tension pulley and the circular mounting opening for the guide pulley are provided on opposite sides of the common plane of the tension pulley and the guide pulley, and wherein the cage further includes a transition section which is partially S-shaped as seen from a distant point lying on the common plane of the tension pulley and the guide pulley, wherein preferably the S-shaped transition section is devised so as to allow the passage of the bicycle chain from the guide pulley to the tension pulley.

19. The chain guide according to claim 4, wherein the chain guide further includes at least two bolts passing through the lockring for threading engagement with the cage.

20. The chain guide according to claim 5, wherein the mounting means include at least two locking bolts for connecting the outer cage and the inner cage.

\* \* \* \* \*